Patented Apr. 24, 1923.

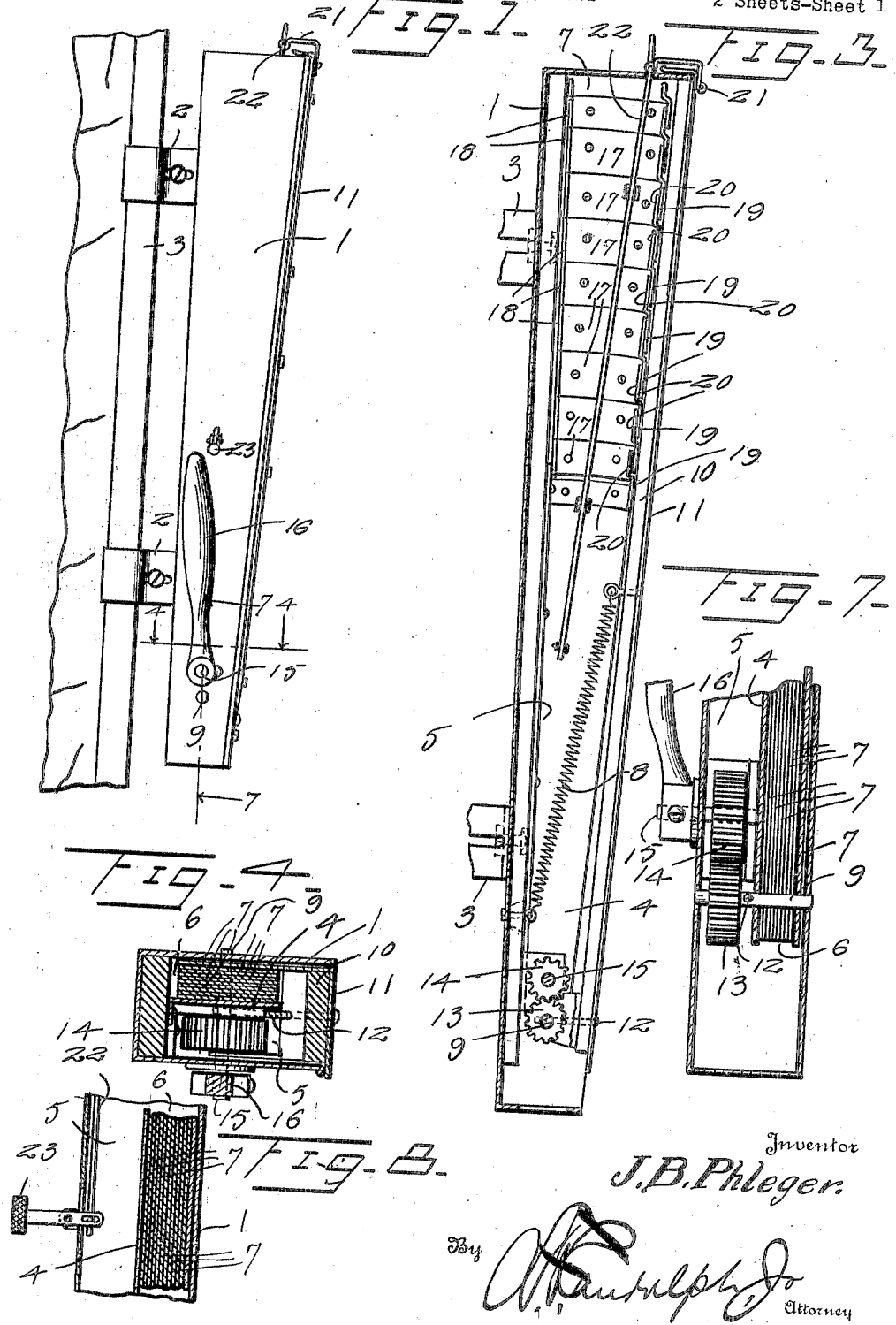

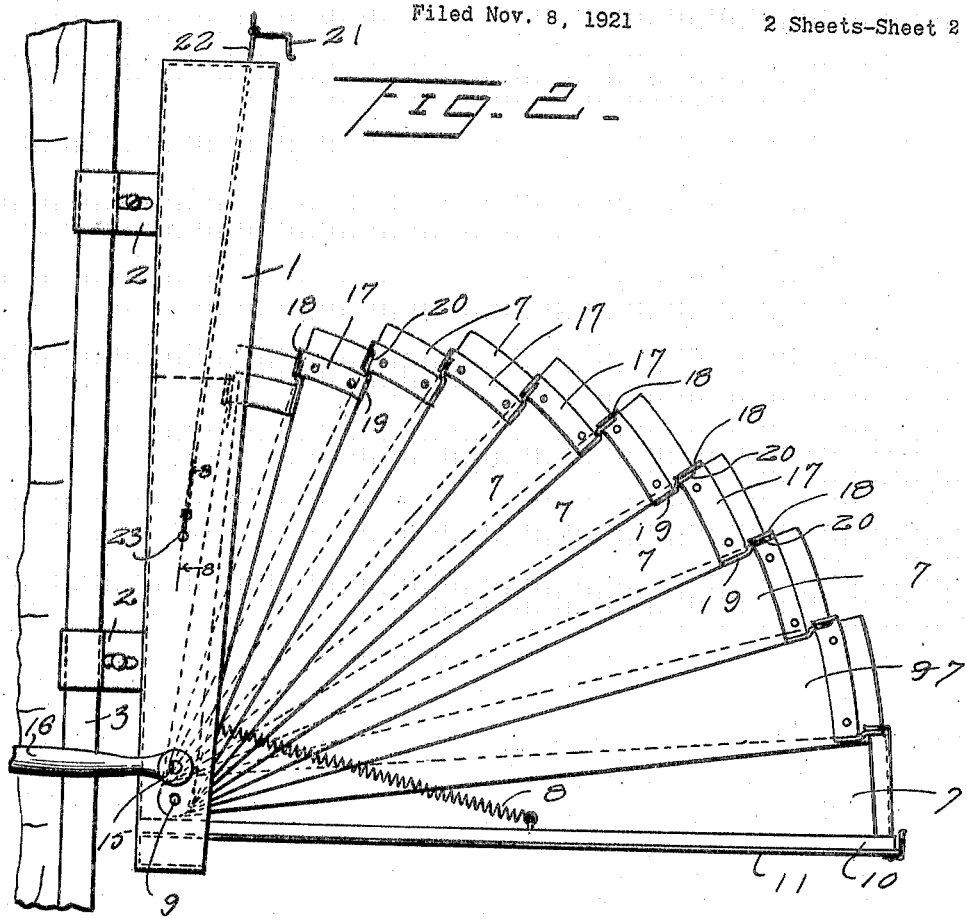

1,453,179

UNITED STATES PATENT OFFICE.

JOHN B. PHLEGER, OF DAYTON, OHIO.

VEHICLE SIGNAL.

Application filed November 8, 1921. Serial No. 513,635.

*To all whom it may concern:*

Be it known that I, JOHN B. PHLEGER, a citizen of the United States, residing at Dayton, in the county of Montgomery and State of Ohio, have invented certain new and useful Improvements in Vehicle Signals; and I do hereby declare the following to be a full, clear, and exact description of the invention, such as will enable others skilled in the art to which it appertains to make and use the same.

The invention provides a signal designed chiefly for vehicles to give warning so as to prevent a casualty by head-on or rear-end collision. While the device is intended more particularly for automobiles and motor vehicles it may be used in connection with railways or wherever signals are required to be displayed.

The invention consists of a signal embodying a casing, a plurality of vanes pivoted so as to fold within the casing, stop and guide means at the outer ends of the vanes to maintain them in proper working relation, a closure for the open side of the casing, preferably forming a part of the outer-most vane, actuating means for spreading and folding the vanes and fastening means for securing the parts when folded.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a front view of a signal embodying the invention, the vanes being folded, Figure 2 is a view similar to Figure 1, the vanes being spread, Figure 3 is a view corresponding to Figure 1, the front of the casing being omitted, Figure 4 is a horizontal section on the line 4—4 of Figure 1, Figure 5 is a detail perspective view of the outer end of one of the vanes, Figure 6 is a detail view of the outer end portions of adjacent vanes, showing them expanded, Figure 7 is a detail sectional view taken on the plane indicated by the line 7—7 of Figure 1, and Figure 8 is a detail sectional view taken on the plane indicated by the line 8—8 of Figure 2.

Corresponding and like parts are referred to in the following description and designated in the several views of the drawings by like reference characters.

The signal embodies a casing 1 which is elongated and slender and open at its outer or front side. Clamps 2 or other suitable fastening means are provided for attaching the casing to a convenient part of the vehicle, such as a standard 3 employed for supporting the windshield. A partition 4, secured to the back of the casing, sub-divides the latter into compartments 5 and 6, the latter receiving vanes 7 and the compartment 5 adapted to house a counter-balancing spring 8 and the vane actuating mechanism.

The vanes 7 are pivotally mounted at their lower ends upon a shaft 9 and progressively vary in length and are provided at their outer ends with stop and guide means. The vanes 7 are of uniform width and preferably consist of sheet metal strips and are adapted to fold so as to lie within the casing 1 or to be spread, as indicated most clearly in Figure 2, so as to present an extended surface which is colored to attract attention and give warning of impending danger and thereby avoid a casualty. The outermost vane is provided with a wing or flange 10 preferably forming a part thereof and which is adapted to close the front of the casing 1 when the signal is folded. A plate 11 is connected with the wing or flange 10 to move therewith and its edges are adapted to overlap the sides of the casing 1 and insure the formation of a close joint. The spring 8 is of the contractile helical form and connects the front of the casing with the back thereof and serves as counter-balancing means for the vanes to facilitate the closing or folding thereof and hold the same in closed position.

The shaft 9 is journaled in the side of the casing 1 and the outermost vane 7 has connection therewith, whereby the two fold in unison. As shown, the shaft 9 is connected to the wing 10 and plate 11 by means of a fastening 12. A gear wheel 13 is fast to the shaft 9 and is in mesh with a companion gear wheel 14 fast to a shaft 15 which is mounted in the partition 4 and a side wall of the casing 1, the outer end projecting and receiving an operating handle 16 by means of which the vanes are spread or folded.

Each of the vanes 7 is provided at its outer end with a transverse strip 17 which has its opposite ends bent laterally to provide stops 18 and 19. The outer stop 19 has an extension 20 which is inwardly offset to bring the stops in line when the vanes are closed, as indicated most clearly in Figure 3, and to insure the overlapping of the longitudinal edge portions of the vanes when the latter are spread, whereby their folding is assured when contracting the signal after being displayed. When spreading the signal, the stop 18 of the outermost vane engages the extension 20 of the stop 19 of the next vane in order, and this operation is repeated for each of the vanes in successive order. When folding the signal, the stop 19 of the outermost vane engages the extension 20 of the stop 19 of the next vane in order and so on in rotation until the vanes are folded within the casing 1, the latter being closed by means of the parts 10 and 11 in the manner stated.

It is to be understood that the signal will be provided so as to be applied to the right hand or left hand side of a vehicle and that both sides of the vanes may be suitably colored to attract attention and insure proper warning being given. The signal may be constructed to be applied to any convenient part of the vehicle and when closed, suitable locking means may be employed for fastening the front. In the present instance, a catch 21 is mounted upon the casing 1 and a rod 22 connects said catch with a fingerpiece 23 which is conveniently located so as to be readily accessible. The fastening means may be disposed in any preferred way and are preferably arranged within the casing so as to be out of the way and housed thereby.

What is claimed is:

1. A signal of the character specified comprising a plurality of pivoted vanes adapted to be folded and spread, and stop and guide means on each of the vanes to direct and limit the movements thereof in each direction, said means consisting of transversely disposed strips having opposite end portions bent laterally in the same direction and corresponding ends of the strips expanded.

2. A signal of the character specified comprising a plurality of pivoted vanes adapted to be folded and spread, and stop and guide means on each of the vanes to direct and limit the movements thereof in each direction, said means consisting of transversely disposed strips having opposite end portions bent laterally in the same direction and corresponding ends of the strips expanded and inwardly offset, whereby the respective stops are adapted to aline when the vanes are in folded position and the edge portions of the vanes adapted to overlap when in spread position.

3. A signal of the character specified having a casing and comprising a plurality of pivoted vanes adapted to be folded and spread, said vanes uniformly varying in length with the shortest vane secured in the casing, stop and guide means on each of the vanes to direct and limit the movement thereof in each direction, said means consisting of transversely disposed strips having opposite end portions bent laterally in the same direction, said strips being arranged at uniformly varying distances from the pivot and corresponding ends of the strips being inwardly offset, whereby the respective stops are adapted to align when the vanes are in folded position and the edge portion of the vanes are adapted to overlap when in spread position.

In testimony whereof I affix my signature in presence of two witnesses.

JOHN B. PHLEGER.

Witnesses:
 JNO. N. WEISS,
 EDNA PHLEGER.